United States Patent [19]

Stannard et al.

[11] Patent Number: 4,681,689
[45] Date of Patent: Jul. 21, 1987

[54] V-SHAPED TROUGH FILTERS, ROTARY ASSEMBLIES THEREOF AND METHODS OF FILTERING THEREWITH

[75] Inventors: Forrest B. Stannard, Inverness; Edward J. Highstreet, Crystal River, both of Fla.

[73] Assignee: The Dehydro Corporation, Charlotte, N.C.

[21] Appl. No.: 833,002

[22] Filed: Feb. 26, 1986

[51] Int. Cl.⁴ .............................................. B01D 33/08
[52] U.S. Cl. .................................... 210/784; 210/404
[58] Field of Search ............... 210/402, 403, 404, 161, 210/157, 541, 542, 784

[56] References Cited

U.S. PATENT DOCUMENTS 1,878,998   9/1932   Akins ................................... 210/402

Primary Examiner—Frank Sever
Attorney, Agent, or Firm—Carroll F. Palmer

[57] ABSTRACT

Filter units for use in filtering liquid suspensions of material prone to form a filter cake resistant to continued flow of filtrate therethrough, e.g., wastewater treatment sludge, have a pair of planar sides arranged in a V-shape. Such sides are formed of rigid filter media, e.g., porous sheets of granular material bound in a resin matrix. Suspension to be filtered is charged into the trough and filtrate is drawn by vacuum through its porous sides. A plurality of such units are arranged side-by-side about a common center in a cylindrical assembly which can be rotated about such center at a predetermined rate to permit each unit to pass through a series of filtering steps to provide new filtering methods.

8 Claims, 5 Drawing Figures

V-SHAPED TROUGH FILTERS, ROTARY ASSEMBLIES THEREOF AND METHODS OF FILTERING THEREWITH

BACKGROUND OF THE INVENTION

1. Field of the Invention

This invention relates broadly to filter devices and filtering methods for filtration of fluid suspensions that form flow resistant filter cakes. More particularly, it concerns new forms of filter units, rotary assemblies of such units and methods of performing a series of filtering operations in such rotary equipment.

2. Description of the Prior Art

There are a variety of liquid suspensions encountered today in large amounts that must have liquid removed therefrom inexpensively to produce a filtrand of substantially increased solids content that may be handled, such as by trucking, for disposal. For example, the treatment of municipal wastewater produces large amounts of sludges that present a myriad of problems in handling and disposal. Further, continued residential, commerical and industrial developments require the provision of ever increasing waste-water treatment capacity, resulting in a corresponding increase in plant effluent and by-products. The disposal of the resulting sludge and related materials becomes ever more serious, not only because of the increase in their total volume, but also because of the increase in disposal restrictions imposed by environmental regulations.

While the invention is described with particular reference to wastewater sludge dewatering, the new devices and methods may be effectively used for the filtration of a wide spectrum of other fluid suspensions of particulate material.

In the operation of sewage treatment plants and the process of dewatering sewage sludge as a step in disposing of it, the sludge influent to the dewatering step will contain about 0.5% to 5% solids. In order to handle the sludge as a "dry product" for trucking to a disposal site, the sludge should contain at least about 10% solids.

Wastewater treatment sludges can be divided into a few basic types, e.g., alum sludge (chemical), hard sludge, aerobic domestic sewage sludge (bio-mass) and anerobic digested domestic sewer sludge (bio-mass). The present invention relates to new devices and methods capable of handling all of such classes of sludge.

Typical filter apparatus for sludge dewatering is an open tank containing a bed of loose sand supported on a lower bed of gravel which, in turn, is supported upon the floor of the tank, usually made of concrete. This type equipment is referred to in the trade as GFM equipment, i.e., granular filter media equipment (see for example U.S. Pat. No. 1,802,726).

As water is removed from the influent in such equipment a filter cake builds up on the top of the sand layer until the cake contains about 6% solids. Depending upon the amount of time the sludge charge is allowed to remain in the equipment, it can be dewatered up to about 12–45% solids. The sludge is removed from the sand bed by shovels, back-hoes or other scraping or scooping devices. Usually a thin layer of sludge will remain on the top of the sand bed and will hinder the dewatering of the next batch of influent. Rakes or scrapers are often used to remove this sludge residue, but this can result in loss of sand requiring replenishment of the sand bed. Furthermore, this GFM type sludge dewatering is undesirably slow and requires large area filters to attain needed throughout. Land acquisition costs, therefore, can be high.

Because of the problems associated with GFM dewatering of sewage sludge, much work has been done on the development of other types of dewatering methods and equipment. Another type of sludge dewatering apparatus uses a rigid bed or plate of solid particles bound in a matrix of cured resin in place of the conventional sand bed. This type of equipment is referred to as RFM equipment, i.e., rigid filter media equipment and examples of RFM devices are disclosed in the following U.S. Pat Nos.

| | | |
|---|---|---|
| 4,208,288 | 4,382,863 | 4,431,549 |
| 4,309,292 | 4,381,998 | 4,452,698 |
| 4,340,478 | 4,399,042 | 4,481,114. |

Still other developments in sludge dewatering have included (a) vacuum assisted rotating filters (see U.S. Pat. No. 2,230,385; (b) rotary vacuum drums (see U.S. Pat. No. 3,338,412); (c) pressurized vessels (see U.S. Pat. No. 3,397,140) and (d) vacuum assisted horizontal moving belt filters (see U.S. Pat. No. 4,217,219).

The use of vacuum to improve the efficiency of filtering operations was well known much prior to the vacuum filtering operations mentioned above with regard to sludge dewatering (see U.S. Pat. Nos. 809,861; 1,135,080 and 1,595,344). Also the concept of vacuum assist has been used in the dewatering of other sludges than sewage sludge, e.g., sludges generated in the metal, mining and chemical industries (see U.S. Pat. Nos. 3,870,641 and 3,929,642).

The present invention provides new improvements in filtering and dewatering equipment that comprise rotary filter equipment in unique combinations with other essential units and in new filtering methods that utilize such equipment.

OBJECTS

A principle object of the invention is the provision of new improvements in filter devices and methods.

Further objects include the provision of:

1. New equipment for the rapid filtration of sewage sludge or similar fluid suspensions prone to form a filter cake resistant to the flow of liquid.

2. New forms of rotary filtration devices.

3. New assemblies of filter units designed for the use with vacuum assist in the dewatering of fluid suspensions of particulate material.

4. New filtration methods to increase the rate of dewatering and to reduce problems in the handling of dewatered sludge.

5. New filter devices comprising a plurality of filter troughs arranged in such manner as to reduce the area required to handle a given quantity of influent and concurrently to increase the filtration rate.

Other objects and further scope of applicability of the present invention will become apparent from the detailed description given hereinafter; it should be understood, however, that the detailed description, while indicating preferred embodiments of the invention, is given by way of illustration only, since various changes and modifications within the spirit and scope of the invention will become apparent to those skilled in the art from this detailed description.

SUMMARY OF THE INVENTION

The objects are accomplished, in part, in accordance with the invention, by the provision of filter units comprising a pair of rigid, porous sheets formed of granular material fixed in a solid matrix, such sheets each having a substantially flat front side and a substantially flat back side. The sheets are spaced apart with their front sides defining therebetween a V-shaped trough having a closed apical portion and an opposed open portion. A web, which may be pervious or impervious, closes each end of the trough, and there is means to apply a vacuum to the back sides of the sheets.

In preferred embodiments of such filter units, their apical portions are porous and there is means to apply a vacuum to such porous apical portions. Also, the webs closing the ends of the troughs may be porous, e.g., made of the same material as the side sheets, and the unit may include means to apply vacuum to the back sides of the porous webs.

The objects are further accomplished by the provision of rotary filter devices for use in filtering liquid suspensions of material prone to form a filter cake resistant to continued flow of filtrate therethrough formed of a plurality of filter units as described above fixed in a cylindrical assembly with the back sides of adjacent units facing one another and with a space therebetween. In such assembly of filter units, the apical portion of each unit is positioned around a common center so the porous side sheets radiate from the common center in spoke-like fashion. There is means to apply a vacuum to at least one back side of each trough plus means to rotate the cylindrical assembly about its common center.

The objects are still further accomplished by the provision of filtration methods which comprise (a) providing a rotary filter device as above described that can rotate about the common center as a horizontal axis, (b) rotating the device about the horizontal axis at a predetermined rate whereby each the unit therein passes seriatim through a first quadrant wherein the unit will attain an uppermost position of rotation, a second quadrant, a third quadrant wherein the unit will attain a lowermost position of rotation and a fourth quadrant, (c) charging a liquid suspension to be filtered into a V-shaped trough positioned in the first quadrant, (d) applying vacuum to a back side of the V-shaped trough in its passage through at least one of the first and second quadrants, (e) discharging filter cake from the V-shaped trough in its passage through the second or third quadrant, and (f) cleaning the V-shaped trough in its passage through at least one of the third and fourth quadrants. In such methods, the filter cake may be discharged by force of gravity or it may be discharged by application of fluid pressure to the back side of the V-shaped trough.

BRIEF DESCRIPTION OF THE DRAWINGS

A more complete understanding of the invention may be had by reference to the accompanying drawings in which.

DESCRIPTION OF THE PREFERRED EMBODIMENTS

Figure 1:
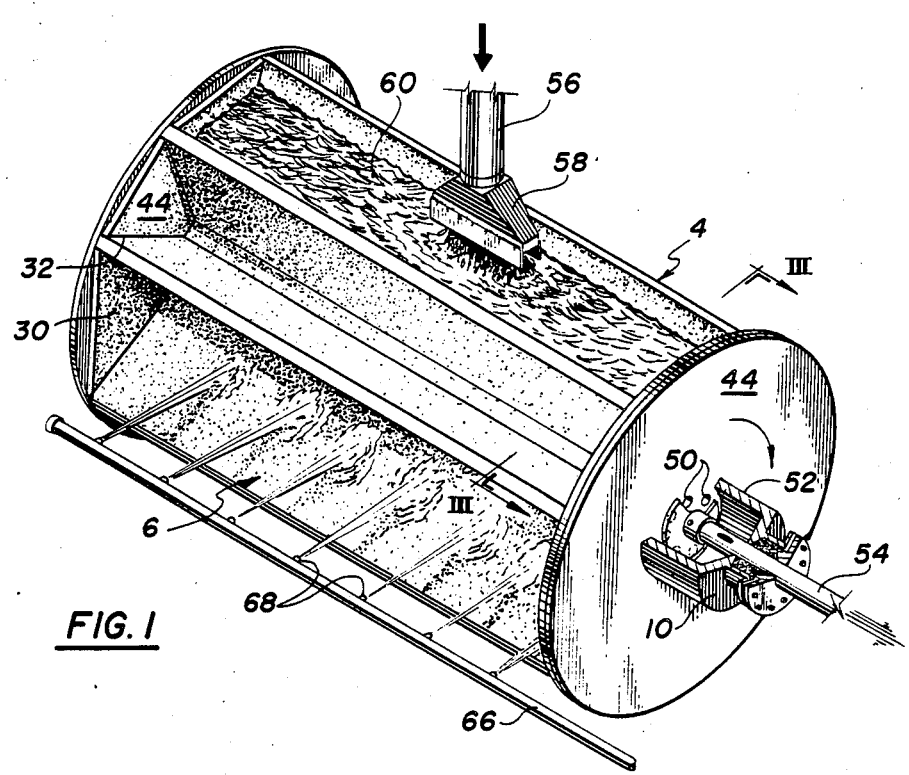
FIG. 1 is an isometric view of a filtration device of the invention formed of a plurality of V-shaped troughs.
Figure 2:
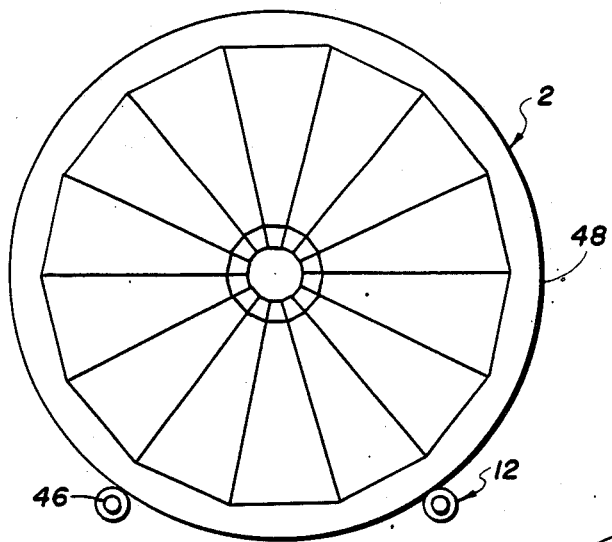
FIG. 2 is a lateral view of a filtration device of the invention.
Figure 3:
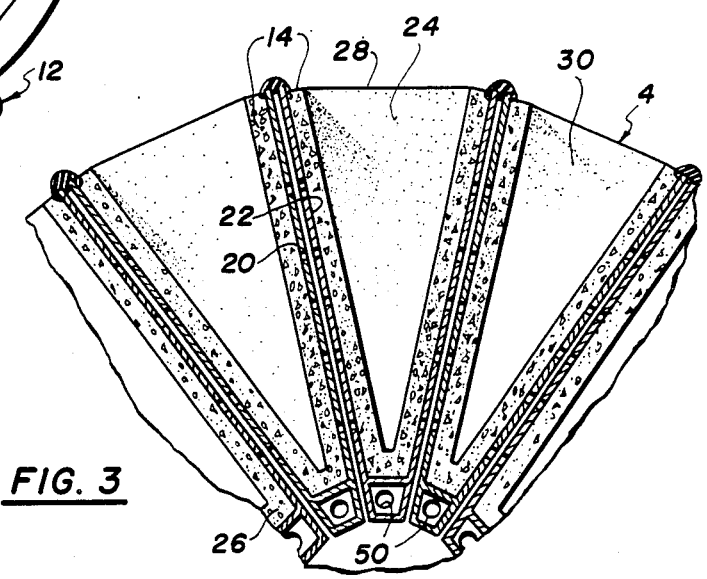
FIG. 3 is a fragmentary, sectional view taken on the line III—III of FIG. 1.
Figure 4:
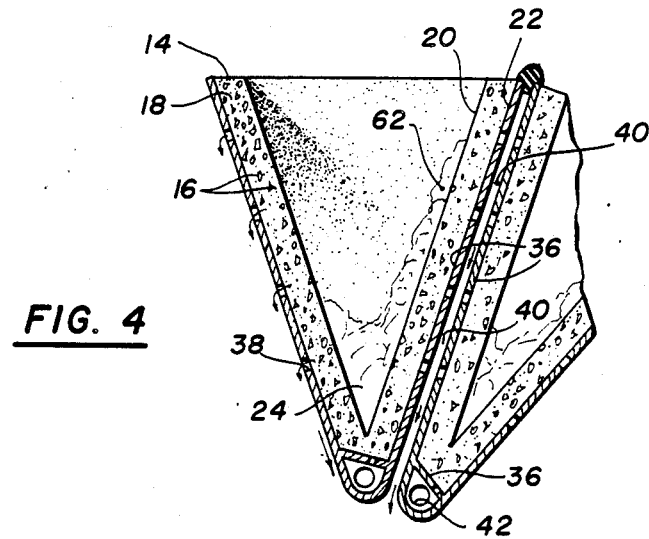
FIG. 4 is a fragmentary, lateral, sectional view of a filter unit of the invention.

Referring in detail to the drawings, in which identical parts are identically marked, the invention relates filtration devices 2 formed of a plurality of V-shaped filter units 4 arranged in a cylindrical assembly 6 about a common center 8 and including vacuum means 10 and assembly rotation means 12.

Each filter unit 4 comprises a pair of rigid, porous sheets 14 formed of granular material 16 fixed in a cured resin matrix 18. The sheets 14 each have a substantially flat front side 20 and a substantially flat back side 22. The sheets 14 are spaced apart with their front sides defining therebetween a V-shaped trough 24 having a closed apical portion 26 and an opposed open portion 28. Webs 30, which may be pervious or impervious, close the ends 32 of the troughs 24. The vacuum means 10 is arranged to apply suction to back sides 22 of the sheets 14.

In preferred embodiments of such filter units, their apical portions 26 are porous and the vacuum means 10 is capable of applying a suction to such porous apical poprtions 26. Also, the webs 30 closing the ends 32 of the troughs 24 may be porous. Advantageous, the portions 26 and webs 30 can be made of the same material as the side sheets 14. In such embodiments, for example, the side sheets 14 would be rectangular panels of rigid filter media (RFM), as discussed in more detail below, the portion 26 would be a narrow, rectangular strip of the RFM and the webs 30 would be triangular panels of the same FRM. These panels and strips could be fixed together at their edges with suitable cement, by tongues and grooves, by edge strips or clamps, or any other suitable way. The V-shaped units so constructed can be supported upon perforate frame members 34 and 36 such as properly shaped sheets of stainless steel, plastic, etc. provided with holes 38 or other perforations to permit liquid to pass from the back sides of such units through the members 34 and 36 and into the space 40 and 42 to form conduits of the vacuum means 10. The frame members 34 and 36 may, in turn, be fixed to or otherwise supported on circular end plates 44 made of suitable metal, plastic or the like.

The particulate material used in the rigid filter media is preferably of relatively uniform size between about 5 to 35 mesh size (standard sieve) and especially between about 10 to 18 mesh size. The particulate material preferably constitutes about 50 to 95% by weight of the RFM and may be selected from a variety of commerically available materials inert to the influents to be filtered in the devices 2. Crushed and sized alumina is a preferred material. Alternatives include, ceramics, plastic particles, anthracite, silicon carbide, garnet, and like materials extensively in the coated abrasives industry.

The resin preferred for use as the matrix material in the RFM is epoxy resin. Other resins capable of conversion to a cured, hard condition may be used, e.g., phenol-aldehyde resins, polyester resins, urea-aldehyde resins, resorcinol-aldehyde resins and equivalent curable resins.

The filter unit is prepared by forming a mixture of the uncured resin and particulate material and filling a suitable mold to the desired depth. The applied mass is then screed and allowed to stand until the resin cures and forms the solid filter media. Wire mesh, expanded metal sheet, woven cloth or other interlayer material may be included in the RFM for strengthening purposes.

The means 12 for rotation of the filter unit assembly 6 can be of a variety of forms. Preferably, the means 12 comprises plurality of rollers 46, driven by motor or other power means (not shown), upon which the peripheries 48 of the plate 44 rest. The rollers 46 would can be perfectly horizontal so the assembly 6 has no vertical pitch, or they can be at a slight angle to the horizontal so the assembly 6 and its common center 8 are pitched slightly downward to one side to promote filtrate flow by gravity.

Alternatively, the rotation means 12 can be a shaft or column that extends through the common center 8 to support the assembly 6 in a horizontal position. Such shaft or column (not shown) would be driven by electric motor or like power device.

The vacuum means 10 for applying suction to parts of the filter units 4 may take a variety of forms. In a preferred form, the means 10 comprises holes 50 in end plates 44, which holes connect the passages 40 and 42 with an end manifold 52 that is joined via tube 54 to a vacuum pump (not shown) or like vacuum source by which suction may be applied to the back side of sheets 14, webs 30, etc. via the tube 54, manifold 52, holes 50 and passages 40 and 46. The manifolds 52 may include glands, packing or the like to permit the plates 44 to slide over then in fluid tight fashion to maintain the desired vacuum in the system.

Charging of material to be filtered (dewatered) may be accomplished in different ways. A preferred way is to have an overhead conduit 56 with end 58 positioned so as to discharge into the filter unit 4 that is a the top position of the assembly 6, i.e., in the first quadrant of travel. The conduit will connect via suitable valves (not shown) to a source (not shown) of sewage sludge or other material to be filtered.

Figure 5:
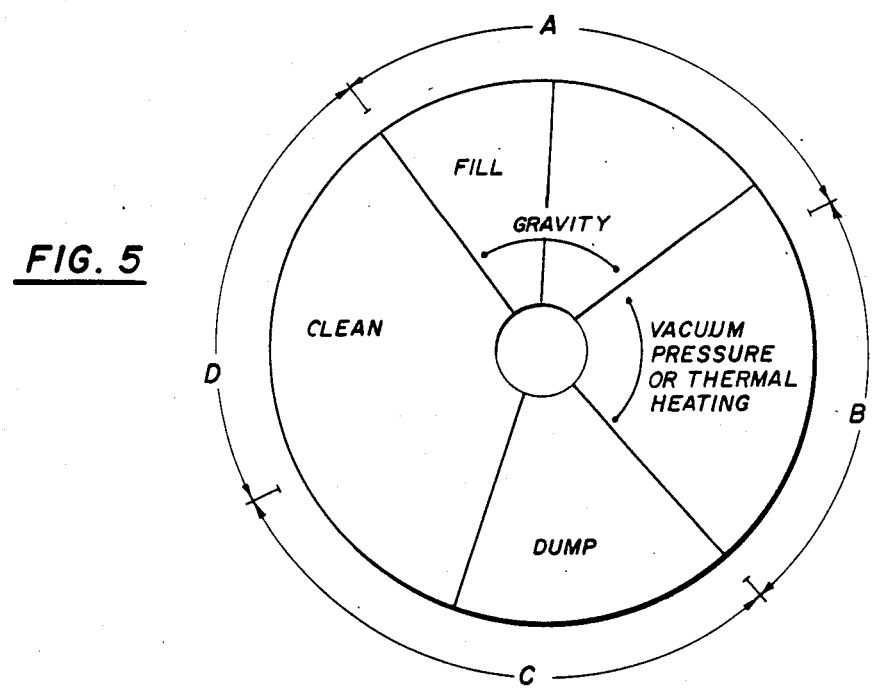
FIG. 5 is a diagrammatic illustration of various operational stages a filtration method performed in accordance with the invention.

The method of filtering sludge or other suspensions with the devices 2 is relatively simple and substantially automatic. The various operational steps involved can be more fully understood by reference to FIG. 5.

With the rotary filter device 2 mounted on the rollers 12 so that it can rotate about the common center 8 as a horizontal axis, the device 2 is rotated at a predetermined rate whereby each filter unit 4 therein passes seriatim through a first quadrant (A) wherein the unit 4 will attain an uppermost position of rotation, a second quadrant (B), a third quadrant (C) wherein the unit will attain a lowermost position of rotation and a fourth quadrant (D).

Liquid suspension 60 to be filtered is charged via conduit 56 into the V-shaped 4 trough positioned in the first quadrant as the rotation of the device 2 on the rollers 12 brings trough 4 under the discharge 58. As the assembly 6 rotates through the initial part of the first quadrant (A), liquid can be allowed to drain by force of gravity through the porous sides 14, apical portion 26 and end webs 30 into the spaces 40 and 42. Then with further rotation, either in the first or second quadrants or both, a vacuum is applied via means 10 to a back sides 22 etc. of the V-shaped trough 4. This results in further filtrate being sucked through the RFM of the sheets 14, webs 30, etc. creating filter cake 62 build-up in the trough 4.

In the case of the sludge dewatering, a typical influent of sewage sludge will have about 1-2% solids content. As filtrate is removed therefrom by gravity and the sludge reaches a level of about 6% solids, it becomes doughlike. It is at this point in the rotation of the device 2 that the vacuum is applied to the the RFM definiing the V-shaped trough. In preferred embodiments, the suction application can begin first through the apical portion 26 via the chamber 42. Then, with further rotation, larger area of suction is applied, e.g., through the back sides of sheets 14 and the webs 30. Operating in this manner attains optimum formation of the flow resistant filter cake without excessive crack formation therein with its detrimental effect on the filtration operation.

With the rotation of the assembly 6 to bring the trough into or approaching the third quadrant (C), filter cake 62 from the V-shaped trough 4 discharges onto a conveyor belt or like member for transport to a truck or other disposal. In such methods, the filter cake 62 may be discharged by force of gravity or it may be discharged by application of liquid or gas fluid pressure to the back side of the V-shaped trough via the same spaces and channels used to apply the vacuum.

As the V-shaped trough passes through at least one of the third and fourth quadrants, it may be cleansed of filter cake residue that may adhere to the front sides 20 of sheets 14 or other portions of the filter unit 4. This can be accomplished using a horizontal tube 66 fitted with spray nozzles 68 or other suitable cleaning means, e.g., scrapper blade, pressure hose, etc. In this way, each trough 4 as it reaches apogee will be ready to receive another charge of the sludge 60 on which the recited stages of filtration will be performed automatically by the device 2.

The embodiments of the invention in which an exclusive property or privilege is claimed are defined as follows:

1. A rotary filter device comprising: means designed to mitigate problems in the filtration of sewage sludge or similar liquid suspensions prone to form filter cake resistant to the flow of liquid and thereby rapidly reduce the rate of filtration in conventional filtration units, said device being formed of a plurality of filter units, each said unit including a pair of rigid, porous sheets formed of granular material fixed in a cured resin matrix, said sheets each having a substantially flat front side and a substantially flat back side said sheets being spaced apart with their front sides defining therebetween a V-shaped trough having a closed apical portion and an opposed open portion, and a web closing each end of said trough, said filter units being fixed in a cylindrical assembly with the back sides of adjacent units facing one another with a space therebetween and with said apical portion of each unit positioned around a common center, means to apply a vacuum to the back side of each of said sheets, and means to rotate said cylindrical assembly about said common center.

2. The filter device of claim 1 wherein said apical portions of said units are porous.

3. The filter device of claim 2 wherein said apical portions of said units define a tubular center in said device.

4. The filter device of claim 3 having means to apply a vacuum to said tubular center.

5. A filtration method comprising: mitigating problems encountered in filtering sewage sludge or similar liquid suspensions prone to form filter cake resistant to the flow of liquid and thereby rapidly reduce the rate of filtration in conventional filtration methods by,
- providing a rotary filter device formned of a plurality of filter units,
- each said unit comprising:
  - a pair of rigid, porous sheets formed of granular material fixed in a cured resin matrix,
  - said sheets each having a substantially flat front side and a substantially flat back side
  - said sheets being spaced apart with their front sides defining therebetween a V-shaped trough having a closed apical portion and an opposed open portion, and
  - an impervious web sealing each end of said trough,
- said filter units being fixed in a cylindrical assembly with the back sides of adjacent units facing one another with a space therebetween and with said apical portion of each unit positioned around a common center,
- means to apply a vacuum to the back side of each of said sheets, and
- means to rotate said cylindrical assembly about said common center as a horizontal axis
- rotating said device about said horizontal axis at a predetermined rate sufficient that each said unit therein passes seriatim through a first quadrant wherein said unit will attain an uppermost position of rotation, a second quadrant, a third quadrant wherein said unit will attain a lowermost position of rotation and a fourth quadrant,
- charging a liquid suspension to be filtered into a V-shaped trough positioned in said first quadrant,
- applying vacuum to a back side of said V-shaped trough in its passage through at least one of said first and second quadrants,
- discharging filter cake from said V-shaped trough in its passage through said second or third quadrant, and
- cleaning said V-shaped trough in its passage through at least one of said third and fourth quadrants.

6. The method of claim 5 wherein said filter cake is discharged by force of gravity.

7. The method of claim 5 wherein said filter cake is discharged by application of fluid pressure to said back side of said V-shaped trough.

8. The method of claim 5 wherein filtrate is drained by gravity from the influent charged into said V-shaped trough in its passage through said first quadrant prior to said application of vacuum.

* * * * *